United States Patent [19]

Peters

[11] 4,234,893
[45] Nov. 18, 1980

[54] IMAGE DRIFT CORRECTION APPARATUS

[75] Inventor: David L. Peters, Whitney Point, N.Y.

[73] Assignee: The Singer Company, Binghamton, N.Y.

[21] Appl. No.: 945,462

[22] Filed: Sep. 25, 1978

[51] Int. Cl.³ .............................................. H04N 3/22
[52] U.S. Cl. ................................ 358/180; 315/169.2; 315/170
[58] Field of Search ............... 315/369, 370, 371, 387, 315/398; 358/67, 69, 180

[56] References Cited

U.S. PATENT DOCUMENTS

| | | | |
|---|---|---|---|
| 2,913,622 | 11/1959 | Bartram et al. | 315/369 |
| 3,609,445 | 9/1971 | Williams | 315/369 |
| 3,715,620 | 2/1973 | Marro | 315/370 |
| 3,743,883 | 7/1973 | Burns | 315/369 |
| 4,085,425 | 4/1978 | Hamill | 358/180 |

Primary Examiner—Robert L. Griffin
Assistant Examiner—Joseph A. Orsino, Jr.
Attorney, Agent, or Firm—Douglas M. Clarkson; James C. Kesterson; Jeff Rothenberg

[57] ABSTRACT

An image or pictorial scene generated by a raster scan is continuously maintained in proper alignment during normal operation of a visual display system by the use of photosensitive devices mounted to the display surface outside of the field of view. In the described embodiment, the photosensitive device is mounted in a position suitable for monitoring a selected retrace path of the raster scan pattern. During operation, the retrace of the raster is unblanked as it passes the photosensitive device such that elements of the photosensitive device are turned on. The output of the photosensitive elements are compared to signals representative of a properly positioned raster image, and differences between the stored signals and the received signals are then used to generate a correction signal in the feedback loop to vary the position of the moving energy beam such that the raster scan is properly aligned.

9 Claims, 9 Drawing Figures

IMAGE DRIFT CORRECTION APPARATUS

BACKGROUND OF THE INVENTION

This invention relates to the alignment of visual display systems which use a raster scan for generating the visual scene, and more particularly to the stabilization of the position of the pictorial scene on the screen of the visual system of a modern vehicular simulator such as an aircraft simulator.

Most of the various types of visual systems which are used with modern aircraft simulators use a display system which requires a raster scan similar to that used on commercial TV to generate the desired scene. Such raster scan scene generation is used, for example, in camera model systems such as described in U.S. Pat. Nos. 2,975,671; 3,643,345; 3,670,426 and 3,961,133. Raster scan screen generation is also used in computer generated image systems such as described in U.S. Pat. No. 3,621,214 to Romney et al. Both the camera model systems and computer generated systems typically use a CRT (Cathode Ray Tube) for presentation of the scene. Because of the need for realistic cues, and the practice of using two or more CRT's in modern simulators to create a scene larger than what could be produced on a single CRT, the stability of the scene location with respect to the pilot trainee eyepoint is of the utmost importance. It has been found, for example, that to avoid objectionable cues and distortion that the pictorial representation on the CRT should have such high stability that the long term drift is no greater than ½ of a television line width. However, as is well recognized by those skilled in the art, the alignment of the display portion of the CRT screen is affected by a multitude of causes such as variations in the components due to aging, drift due to temperature fluctuations, mechanical settling, etc., and maintaining such stability in the face of so many adverse conditions is extremely difficult. In fact, the drift of direct coupled deflection amplifiers themselves typically used with the CRT's of vehicular visual systems alone usually exceed the criteria of less than ½ of a television line width.

The problem of accurately maintaining the picture location on a CRT has been attacked by various feedback systems, such as disclosed in U.S. Pat. No. 2,913,622 issued to J. F. Bartram, et al, on Nov. 17, 1959. This system uses a wire positioned on and attached to the target screen of the cathode ray tube so as to receive electrons from a correctly positioned beam. A signal generated by the electrons received by the wire is gated with a sine wave signal produced by an oscillator. The output of the gating circuit is only that portion of the sine wave which occurs at the moment a signal is generated by the electron beam as it impinges on the wire. Thus, depending on the location of the beam the gate output will either be zero when properly aligned, two positive pulses if too high or two negative pulses if too low. These resulting positive or negative output pulses from the gating circuit are then used to drive and control the supply voltage that provides signals to the deflection plates used to deflect the electron beam. It will be recalled, however, from the above discussion that a very stable scene is necessary in pilot training. Furthermore, it is desirable that the feedback system for stabilizing the pictorial representation on the CRT screen be continuous even during the operation of the system. Therefore, it will be appreciated that the concept and technique described in U.S. Pat. No. 2,913,622 is not suitable for use as a means to stabilize the pictorial scene used in vehicular simulation because of the jitter resulting from the addition of the sinusoidal wave to the deflection plates during the position correcting process.

Other related systems which require information as to the precise location of an electron beam in a CRT include systems having a light detection pen and associated circuitry such as is disclosed in U.S. Pat. No. 3,594,608 issued to Jon C. Mutton on July 20, 1971. It is also necessary in television camera pickup tubes to be able to receive accurate information about the location of the pickup scan which also follows the standard raster sweep. For example, television pickup tubes which are concerned with receiving light in a raster pattern rather than with sweeping an electron beam, are described in U.S. Pat. No. 3,536,824 issued to Klaus Chmillon on Oct. 27, 1970. In this patent, strip light source are located or positioned either on the upper or lower border and on either the left or right border of the screen of a video pickup tube. As a result, when the scanning pickup crosses the light source, a signal is provided that indicates that the beam has traversed to the limit of the screen in that particular direction. This information is then used for alignment.

Still another related technical area which is concerned with the precise location of a scanning energy beam is in the graphic arts. For example, in U.S. Pat. No. 3,609,440 issued to Ronald F. Cooper on Sept. 20, 1971, certain characters are displayed on the face of a cathode ray tube and optically projected onto a film which is supported against a platen. In order that there be minimun distortion, misorientation or skewing of the characters on the film, it is necessary that the base line trace of the cathode ray tube always fall on a particular line or position on the film. In this invention, two unusually shaped apertures are placed or cut in the platen in a location such that a beam of light which passes through the apertures provides either a zero pulse output if the platen is properly aligned, two pulses if the platen is misaligned in one direction, or a single pulse if the platen is misaligned in the opposite direction. Other patents concerned with the alignment of the electron beam of the CRT include U.S. Pat. No. 3,588,584 issued to Matthew P. Tubinis on June 28, 1971; U.S. Pat. No. 3,872,348 issued to Edward T. Astley on June 18, 1973; U.S. Pat. No. 3,720,857 issued to Tetsuji Shimizu, et al on Mar. 13, 1973; U.S. Pat. No. 3,800,072 issued to Jean C. Lejon on Mar. 26, 1974; U.S. Pat. No. 3,358,184 issued to G. G. Vitt on Dec. 12, 1967; and U.S. Pat. No. 3,621,137 issued to Solomon Manber on Nov. 16, 1971. A somewhat related field dealing with the manufacture of semiconductors and micro-circuits is very concerned with the precise location of an electron beam. Accordingly, U.S. Pat. No. 3,832,560 issued to Terence W. O'Keeffe on Aug. 27, 1974 and U.S. Pat. No. 3,811,069 also issued to T. W. O'Keeffe on May 14, 1974 provides examples of circuitry necessary for precise alignment of electron beams.

Even in view of the knowledge that has developed in the area of controlling the position of an electron beam in a CRT, as is demonstrated by the above referenced patents, it will be appreciated that none of these previous systems provides the half TV line width accuracy along with the continuous monitoring and correction capabilities to the extent required and as does the present invention.

Accordingly, it is an object of this invention to provide an apparatus for precisely controlling the position and location of the raster scan on the display screen of a CRT.

It is another object of this invention to provide an apparatus for precisely controlling the location of a raster scan on a CRT on a continuous basis during the operation of the visual system.

Still another object of this invention is to provide apparatus for controlling the location of the raster scan of a display system or visual system other than a CRT system.

A further object of this invention to provide apparatus for precisely locating the raster scan on the display screen of a visual system which is affected by both electronic and mechanical variations.

SUMMARY OF THE INVENTION

These and other objects will become evident from the following drawings and detail description and are accomplished by the present invention by the use of apparatus which accurately maintains the location of the raster produced by an energy beam on a display surface. This apparatus comprises an optical sensing means which is mounted to the display surface. The optical sensing means is mounted outside of the visible or viewing area, and is positioned to monitor an unblanked portion of a retrace line which also occurs outside of the visible area. The optical sensing unit has sensitivity capable of recognizing a deviation of one half of a raster line width, and provides electrical signals representing the location of the unblanked retrace line with respect to the location of the sensor itself. The optical sensor also includes a means for receiving and comparing the electrical output signals from the sensor with a reference signal which is representative of what the electrical output signal should be when the unblanked portion of the retrace raster line is properly positioned. This comparing means also generates a control signal representative of the difference between the reference signal and the electrical output signal which is combined with the sweep drive signal to maintain the raster scan in a selected location such that the produced scene is always properly positioned on the display surface.

BRIEF DESCRIPTION OF THE DRAWINGS

Accordingly, the above mentioned objects and subsequent description will be more readily understood by reference to the following drawings wherein.

DESCRIPTION OF THE INVENTION

Figure 1:
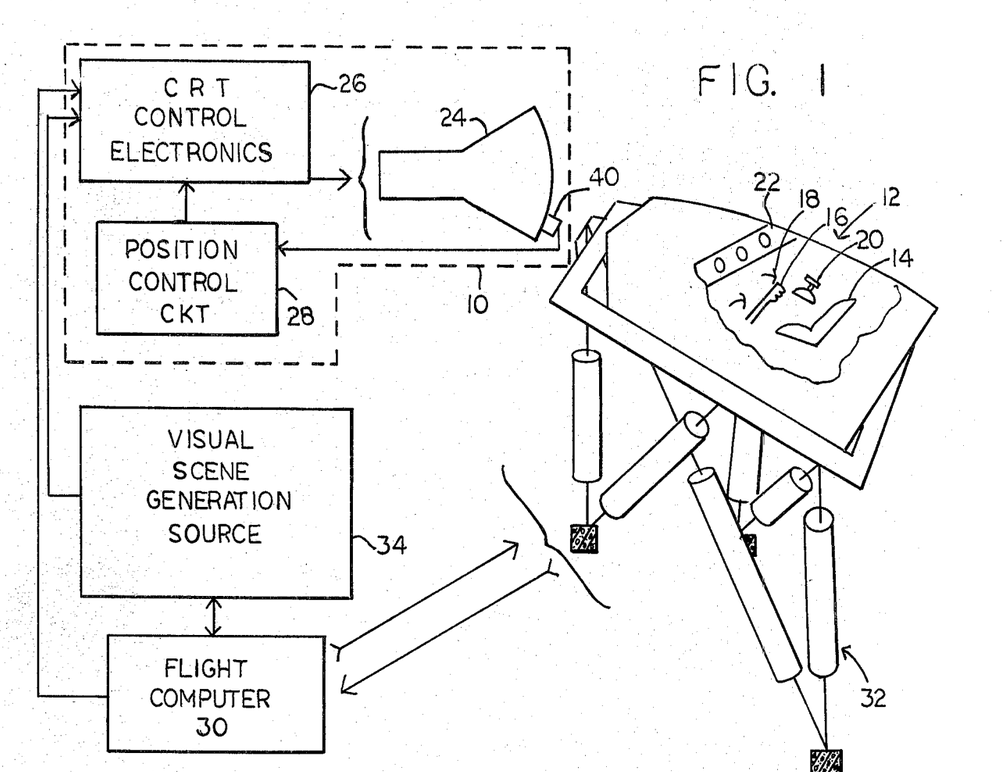
FIG. 1 illustrates, in pictorial and block diagram form, a typical modern flight simulator which includes a visual system using a CRT which is kept in alignment by the technique of the present invention.

Referring now to FIG. 1 there is shown a typical aircraft simulator complex with a CRT display visual system 10 using the closed loop feedback system of this invention to stabilize the pictorial scene located on the CRT. In such a simulator complex, there is included a cockpit 12 which typically includes a pilot seat 14 a control stick 16 for aileron and elevator control, pedals 18 for rudder control, throttles 20 and instrument panel 22. Also included is visual system 10 having a CRT 24 which is viewed by the pilot and controlled by CRT control electronics 26 and position control circuitry 28. The output signal from the controls hereto mentioned are typically applied to flight computer 30; such as, for example, a PDP 11/45 computer such as is made by the Digital Equipment Corporation (DEC) or its equivalent. The computer 30 of a modern simulator complex typically has stored therein all of the necessary flight equations or coefficients applicable to the aircraft being simulated. Thus, as signals representative of the position of the different simulator cockpit controls are received at computer 30, the computer in accordance with the appropriate flight equations and data continuously determines the simulated flight conditions of the simulated aircraft such as attitude, speed, direction, etc. Signals representative of these flight conditions are then applied to instruments in the simulator cockpit to drive the instruments such that they indicate those conditions that the aircraft being simulated would actually experience if such control movements were being carried out with an actual aircraft in flight. These instruments and indicators located on the instrument panel 22 of the simulator cockpit give the student pilot a realistic indication of his simulated altitude, air speed, direction, etc. In addition, the computer also provides input signals to drive the motion system in those simulators wherein a motion system is part of the complex. Thus, the student pilot also receives motion cues in addition to the instrument cues as to the performance of his aircraft.

The present invention is typically used with a simulator complex having a visual display system 10 in addition to either a motion system 32 and/or standard cockpit simulation 12. Visual display systems often comprise a closed circuit television system in which a television camera is moved about a three-dimensional terrain model as the visual scene generation source 34. Apparatus and techniques for controlling camera movement as well as transmitting and displaying the image of the terrain model are disclosed in U.S. Pat. Nos. 2,959,779; 3,052,753 and 3,670,426. In addition to camera model systems mentioned heretofore, visual systems which include a CRT for display may also have the scene generated by means of a computer, commonly referred to as "computer image generation"; such as is disclosed in U.S. Pat. No. 3,961,133 issued to William S. Bennett on June 1, 1976; and U.S. Pat. No. 3,602,702 to Warnock on Aug. 31, 1971 and U.S. Pat. No. 3,621,214 to Romney et al on Nov. 16, 1971.

Figure 2:
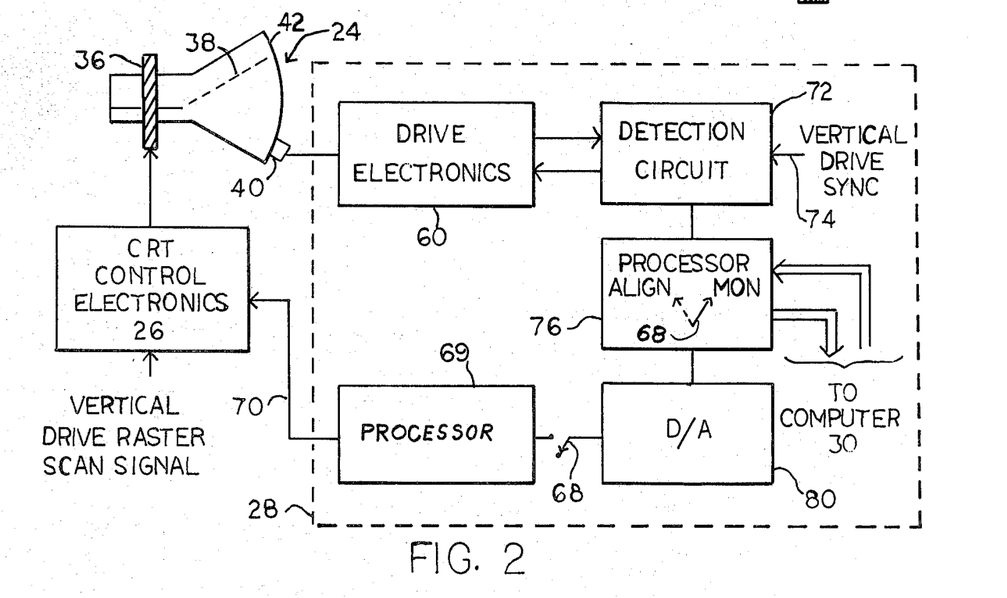
FIG. 2 is a block diagram of the feedback system of the precise alignment circuitry of this invention.

FIG. 2 shows a block diagram of the closed loop feedback system of this invention which monitors and maintains the vertical position of the CRT raster. As is shown, CRT 24 operates similar to a commercial TV in that yoke 36 provides deflection to the electron beam 38 of CRT 24. Although, with appropriate modification, the following information is applicable to controlling the horizontal position of the raster, the following discussion is with respect to vertical positioning. The vertical deflection signals received at yoke 36 are generated by deflection circuits in CRT control electronics 26, and are representative of a combination of the normal vertical raster scan signals as well as correction signals from position control circuitry 28. Position control circuitry 28 which will be discussed in detail hereinafter, provides signal which when combined with the normal raster signal results in a properly vertical positioned raster. The input to position control circuitry 28 is from sensor 40 which in this embodiment is mounted to the CRT face plate or screen 42. Sensor 40 as will be discussed in detail hereinafter monitors the vertical position of the retrace path of the raster, and in combination with position control circuitry 28, a determination is made whether or not the retrace path has shifted with respect to a calibrated location. It will be appreciated by those skilled in the art, that although vertical drifting of the complete raster scan may occur, drifting of the position of the retrace path relative to the position of the remainder of the raster scan path will change much less. Therefore, if the location of the retrace raster line can be precisely monitored and maintained, then the remainder of the raster pattern will also be precisely maintained. Thus in this embodiment, sensor 40 monitors the position of the retrace raster path and provides signals representative of this position to position control circuitry 28. These signals from sensor 40 are indicative of changes in the position of said retrace raster path and provide the necessary information to position control circuitry 28 for generating the necessary correction signals which are then combined with the standard raster deflection signals. These combined signals result in a raster scan which produces a very stable pictorial scene when viewed by the pilot trainee.

Figure 3:
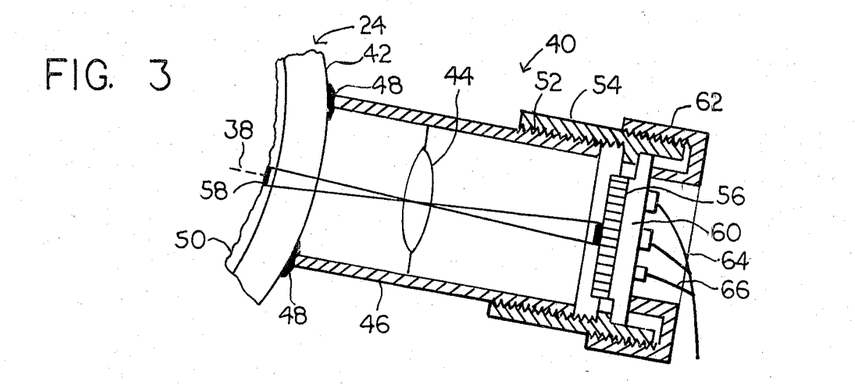
FIG. 3 is illustrative of the sensor used in the feedback alignment circuitry of this invention, and shows the mounting of the sensor on the face plate of the CRT.

Referring now to FIG. 3 there is shown a sensor arrangement 40 which is particularly suitable for the present invention. Lens 44 is mounted inside of tubular member 46, which tubular member is securely mounted or attached to the face plate 42 of CRT 24 by epoxy, glue or the like shown at 48. Lens 44 is adjusted to give a normal focus of the phosphor plane 50 on the inside of the CRT face plate 42. Tubular member 46 includes a threaded end 52 opposite the end mounted to CRT 24. Threaded end 52 is suitable for mating to a second tubular member 54 which also has threads. Second tubular member 54 includes photosensitive device 56 which has a large number of elements which are sensitive to light. A particularly suitable device for this invention is the Fairchild Company CCD (Charge Coupled Device) 101 which has a matrix of 500×1 elements. It will be appreciated that this Fairchild device is comprised of a single line of 500 elements. The operation of a suitable multielement photosensitive device such as the CCD 101 will be discussed in detail hereinafter. During operation, lens 44 focuses an image of a portion of the raster retrace path for the last horizontal raster scan line onto a few elements of the photosensitive device 56. In standard CRT operation, the retrace for all of the scan lines is blanked (i.e. the electron beam is turned off so that the retrace line is not visable). In the operation of this invention, however, the retrace for the last or bottom scan line is momentarily unblanked (i.e. turned on) as it passes sensor 40 as is shown by retrace segment 58 in FIG. 4. Also located in the second tubular member 54 and electrically connected thereto are the drive and sensor electronics 60 necessary for operating the CCD device. It will be appreciated that CCD device 56 and electronics 60 are not permanently mounted in second tubular member 54, but are held in position by threaded ring 62. Thus, as is explained in detail below, ring 62 may be loosened so that CCD device 56 may be rotated until properly aligned. Once alignment and focus is correct, ring 62 is tightened so that it holds CCD device 56 in position. Also connected to the drive electronics for the sensor is the line 64 that provides the monitor signal to the position control circuitry 28, and the line 66 which provides power to the sensors from an external source (not shown).

Figure 5:
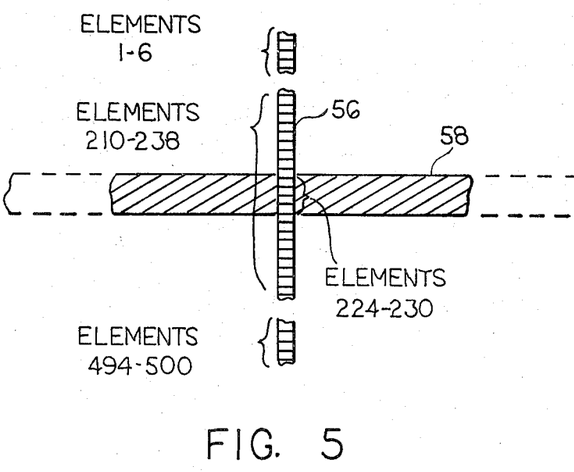
FIG. 5 illustrates how a selected raster line crosses the photo-sensitive element of the sensor used in this invention.

During alignment, ring mount 62 is loosened and the long axis (i.e. 500 element) of the CCD device 56 is set at a nominal right angle to the retrace path which it is to monitor. Because of the large number of photosensitive elements contained in CCD device 56, the placement of the device is not critical and neither is the angular orientation. While maintaining the position of CCD device 56 at a right angle with the retrace path, second tubular member 54 is adjusted with respect to the first tubular member 46 such that lens 44 achieves the best focus of the raster line onto the CCD photo-sensitive elements. It will be appreciated that the best focus is attained when the output signals from the CCD are at a peak value and the raster image covers the smallest number of CCD elements. Once the correct focus is achieved, ring 62 is tightened so that it holds CCD device 56 in position. In the practice of this invention, it has been found that the magnification of the raster line 58 by lens 44 onto CCD elements 56 should cover at least five elements, but no more than about ten elements. Thus in operation, circuitry monitoring the output of the CCD device 56 and drive electronics 60 will provide information as to the number of elements covered by the image of the raster line and the particular elements which are covered. As is shown in FIG. 5, it is assumed that raster line 58 is focused on CCD element 56 such that it covers seven of the individual sensor elements which elements are representative of the 224th through 230th elements.

Figure 4:
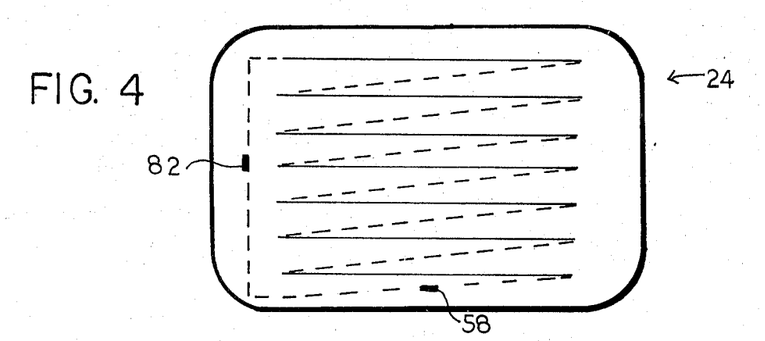
FIG. 4 illustrates a typical complete raster scan on the screen of a display system as is used by this invention.

It will also be appreciated by those skilled in the art, that retrace raster line 58 of FIG. 4 is unblanked during one field only to avoid a double line width that would result because of interlace.

Referring now to FIGS. 2 and 3, alignment and operation of the present system will be discussed. Prior to aligning the centering or positioning circuitry of this invention, the visual system is turned on and aligned both mechanically and electronically according to presently available techniques. This is accomplished by placing alignment/monitor switches 68 to the alignment position which sets the output signal of the position control circuitry on line 70 to zero. While the alignment/monitor switches 68 are in the alignment mode, the location of the line segment of the retrace raster is determined at detection circuitry 72 which monitors the elements of CCD sensor 40 to determine which are covered by the image of raster line 58. In any alignment process, it will be appreciated that this process should be repeated several times to insure noise has not affected the location of the raster line. In the present embodiment, the sampling rate corresponds to the frame rate of one field and is controlled by a synchronization signal received on line 74 generated in response to the vertical drive sync signal. Alignment information concerning the number of elements covered and the location of these elements is stored in either a permanent memory such as a PROM located in central processing circuitry 76 or, alternately this information could be stored in central computer 30 heretofore discussed and the information fed to processor 76 as necessary. The element of device 56 of CCD sensor 40 which is in the center of the image is then determined and used as a reference. The determination of this element may be made by any suitable technique. For example, referring again to FIG. 5, the center element covered by the image of the raster line could be determined by adding the number of the two elements together which border the image of the raster line (i.e. elements 224 and 230) and then dividing by two. The result of this mathematical process is of course 227, as shown in the example of FIG. 5 element 227 would be the center element covered by the image of the raster line. Using the center element as the reference element to indicate the position of the raster line avoids the effects of raster focus changes. For example, if the top or bottom (i.e. 224th or 230th) element were used as the reference element, a change in the raster focus could result in a reading which indicated that the position of the raster had changed. Storage of such information as the number and location of photosensitive elements covered by the raster image, and the center element so covered occurs only when processor 76 is in the alignment mode as is represented by a second alignment/monitor switch 68 being in the alignment position. It will also be appreciated that the circuitry in processor 76 which determines or averages the center element may either be dedicated averaging circuitry or a micro processor. In addition, the central computer itself could process the information and make it available at processor 76.

Once the initial alignment is complete and information concerning the photo-sensitive element which is in the center of the raster line image is determined, the system is set to the monitor position by placing alignment switches 68 to the appropriate positions. It will be appreciated that the alignment switches 68 are representative only, and the required change of mode could be in response to a command from the central computer. During the run or monitor phase, the photosensitive elements 56 and the drive electronics 60 operate as was discussed heretofore with respect to the alignment mode. In addition, the information received by video detector 72 and which is still sampled at the vertical frame rate operates as was discussed heretofore. In the monitor mode, processor 76 receives the same information as in the alignment mode concerning the number of photosensitive elements covered and the location of those elements covered. Also as in the alignment mode, processor 76 uses this information to determine which photosensitive element is in the center of the raster line image. However, unlike the previous modes this information is not stored. In this mode, the current information received is compared with the corresponding stored information obtained during the alignment mode. Thus, for example, the photosensitive elements now covered by the image of the raster line may be numbers 219 through 225 in contrast to numbers 224 to 230 in the alignment mode. It will be appreciated therefore, that the center element is now 222 rather than 227 as was the case in the alignment mode. This change results in an output from processor 76 which is proportional to the change in the center element from the alignment mode to the operation mode (i.e. position 227 to 222). A digital to analog (D/A) convertor 80 converts this signal to an analog signal which is processed as necessary by processor 69 such that it is suitable for combining with the vertical drive raster signal to provide a shift in the overall vertical positioning of the raster scan of the visual system. Thus, the position or location of the complete raster scan is kept in alignment on a continuous basis and thereby removes the long term or near long term drift of the visual system.

It will be appreciated that the system discussed heretofore was for maintaining the vertical position of a raster scan and that the same techniques may be used to maintain the horizontal position of the complete raster scan. For example, by placing a sensor to the side of the normal viewing area of the screen in the area of the vertical retrace path as is shown at 82 in FIG. 4, the horizontal position of the raster scan may be monitored and therefore controlled in the same manner as described above. For this type operation, it will only be necessary that the electron beam be unblanked during the vertical retrace path as it passes the sensor. The remainder of the system operates as already discussed.

Thus, as was discussed above if only vertical location is critical, a system of maintaining only the vertical position of the raster scan would be necessary. On the other hand if only horizontal position was critical then a system for maintaining the horizontal position would be necessary. However, because of the wide spread use in complex visual systems for aircraft simulators of using an array of CRT's to provide a large visual scene it is common that both the horizontal and vertical position be critically maintained. Where both vertical and horizontal positioning is critical, it is a simple matter to simply use two of the above described systems.

In addition to providing a technique for critically maintaining the location of the raster scan of a visual system, it will be appreciated by one skilled in the art that by using four of the above described systems, size as well as centering and positioning can be monitored. That is, by putting one of the sensors at all four borders of the display area along with the necessary electronics, size as well as centering can be maintained.

Figure 6:
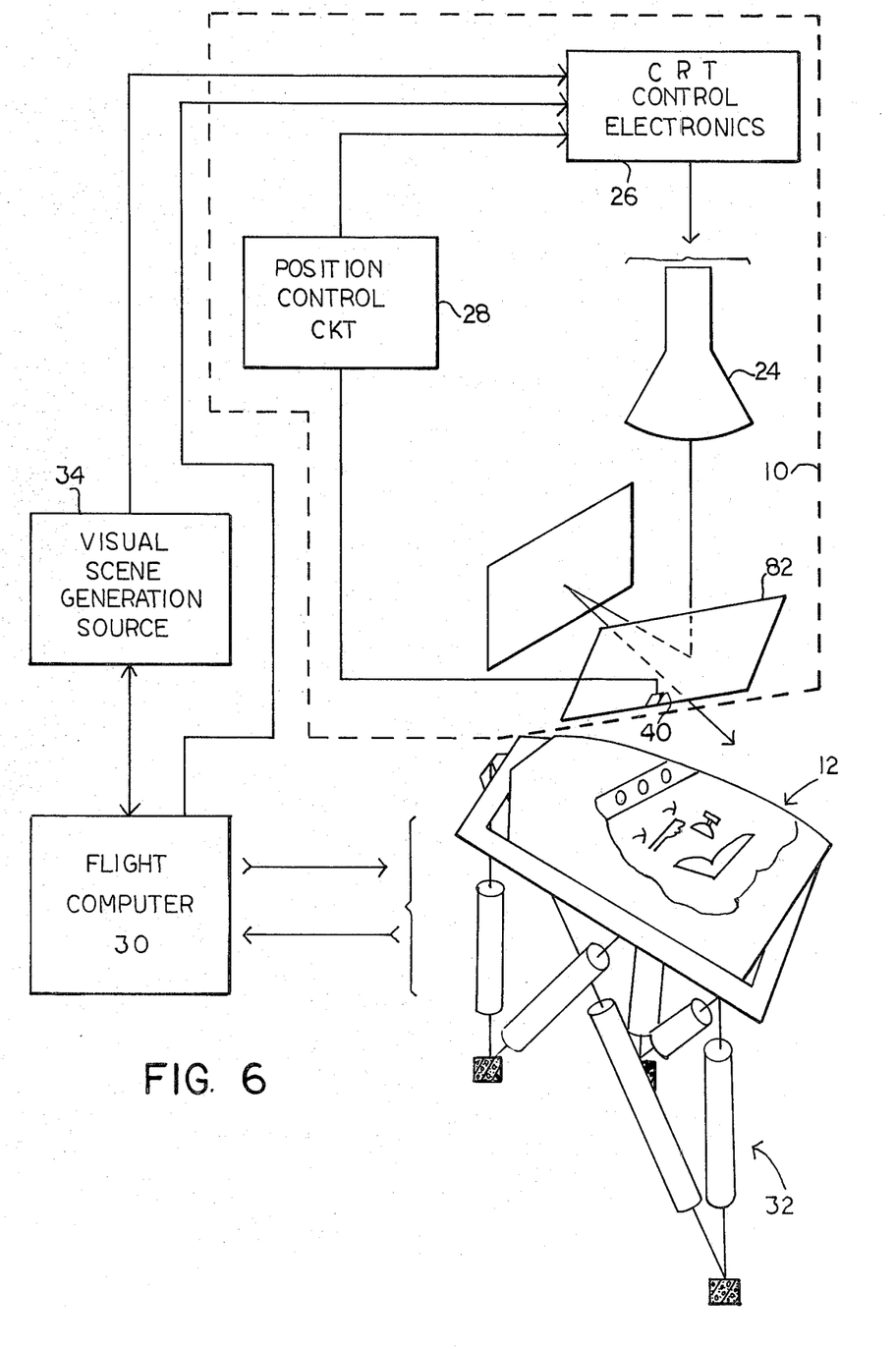
FIG. 6 shown an alternate embodiment of the present invention wherein the sensor of the precise feedback circuitry of this invention is mounted on a beam splitter which serves as a display screen of a visual system.

The previous discussion of the system of this invention was with respect to a direct view CRT. That is, the scene is displayed directly onto the CRT and is viewed directly by the pilot trainee. However, in the visual systems of complex vehicle simulation, it is common to use various arrangements of beam splitters and the like as the final display surface upon which a scene is portrayed, to obtain greater realism and better optical cues. The use of beam splitters, mirrors and other reflecting surfaces will, of course, result in other sources of distortion and position misalignments due to temperature effects and mechanical settling, etc. Thus, it will be appreciated that the concepts of the present invention may be used advantageously with other than direct view CRT's. As is shown in FIG. 6, sensor 40 is mounted on beam splitter 82 which serves as the viewing surface for the pilot trainee. Thus, the raster retrace path is monitored at the beam splitter such that any resulting distortion or settling errors occuring between the presentation of the scene on the CRT itself and the display at the beam splitter may also be corrected. The remainder of the system including the position control circuitry, etc., operates as was discussed heretofore.

Figure 7:
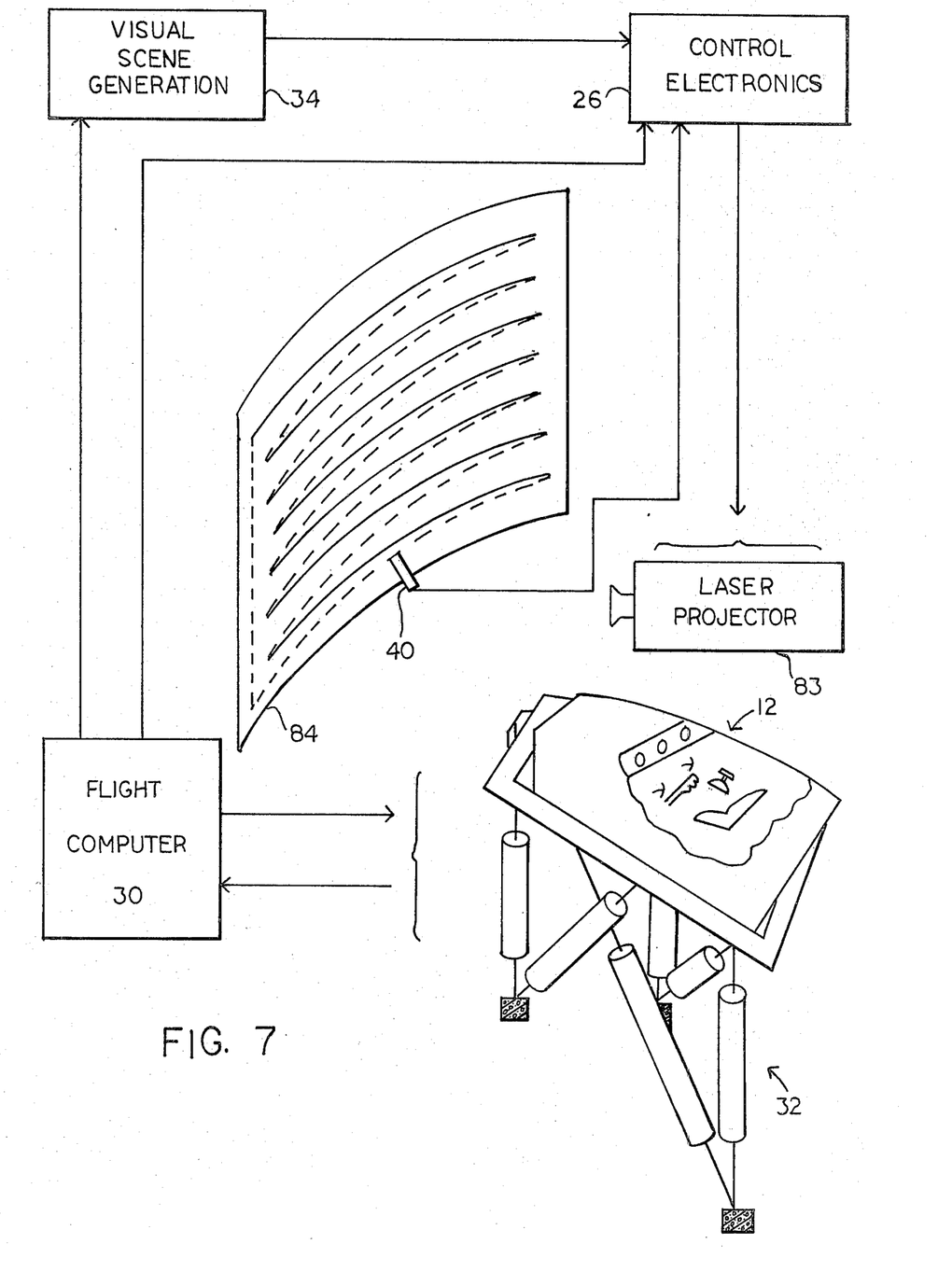
FIG. 7 shows an alternate embodiment of this invention used with a projection type visual system wherein the sensor is mounted to the display surface of the projection system.

In addition to direct view CRT's and indirect view viewing techniques of CRT such as by using a beam splitter or the like, other visual systems using a raster scan pattern for generation of a pictorial scene also benefit from the techniques and teachings of this invention. For example, as is shown in FIG. 7 a projection system such as a laser scan projector 83 which creates an image on projection screen 84 by means of a raster scan can also benefit from this invention. In such a projection display system, sensor 40 is mounted to the actual screen surface in such a manner that the retrace path of the laser beam crosses the sensor 40 in a manner similar to that discussed heretofore. It will be appreciated that although the focusing technique may have to be altered to assure that the raster line is focused properly on the photo sensors, the basic technique and concept for controlling the raster scan position for this type system is identical to that discussed heretofore.

Figures 8, 9:
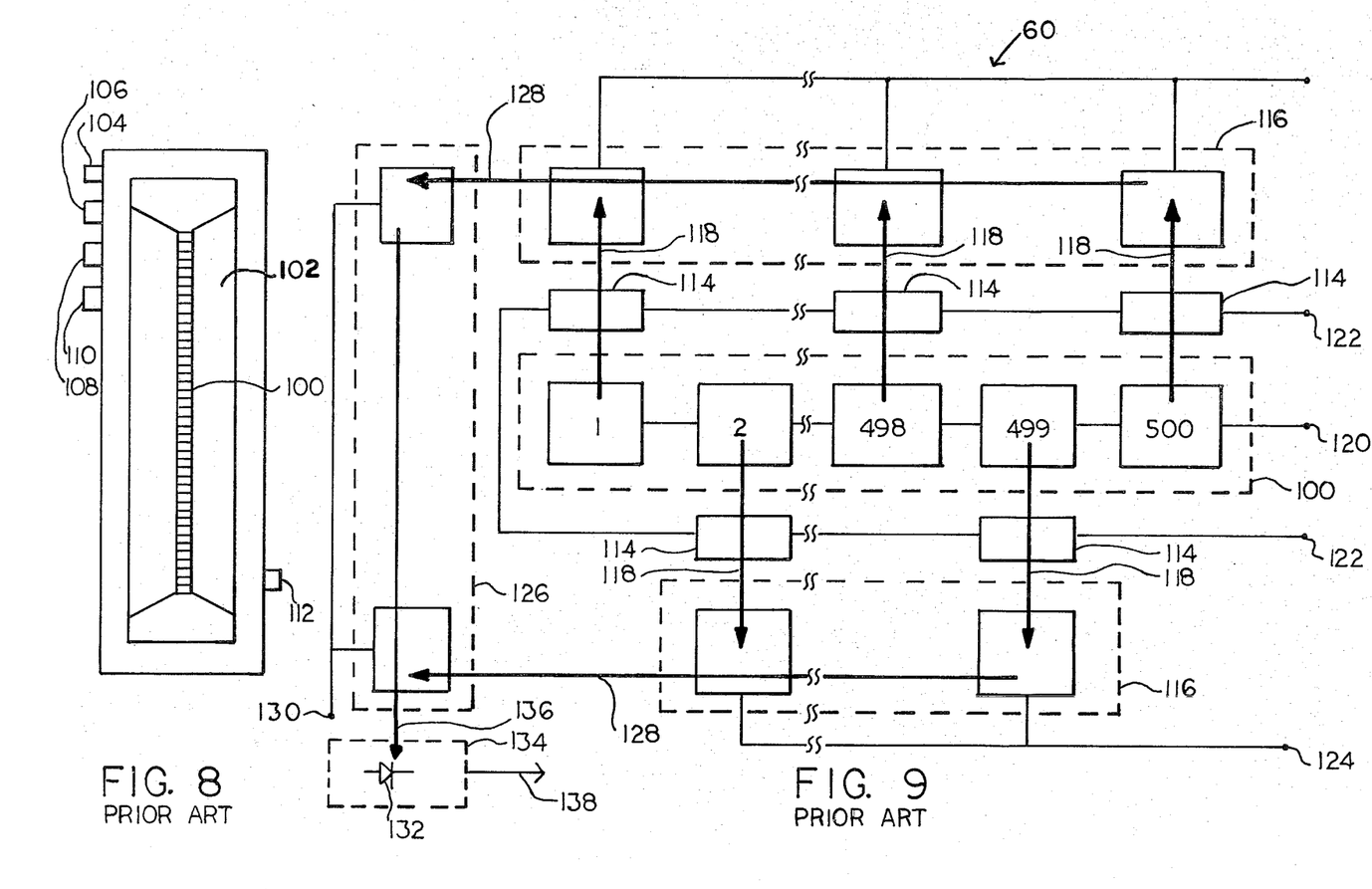
FIG. 8 shows an enlarged top view of a prior art and commercially available multielement photosensitive device suitable for use with this invention.
FIG. 9 is a block diagram of the supporting circuitry for the multielement photosensitive device of FIG. 8.

As was mentioned heretofore, a particular suitable device for use as sensor 40 and drive electronics 60 is the Fairchild Company CCD-101 unit. Such a sensor is suitable for use with the several described embodiments of FIGS. 1, 5 and 7. It will be appreciated that the following discussion concerning the simplified diagrams of FIGS. 8 and 9 which represent the Fairchild CCD-101 device is for explanation purposes only, and for a more detailed explanation of the operation of the Fairchild device the reader is referred to the material on this device provided by Fairchild. Other types of light detection sensors having a resolution equivalent to that of the Fairchild device may be available and would be acceptable for use with this invention. FIG. 8 illustrates an enlarged top view of the Fairchild CCD-101 monolithic self-scanned 500 element image sensor. The 500 image sensor elements 100 are arranged and attached on substrate 102 so that any charge accumulated on elements 100 can be charged coupled in accordance with selected clock pulses to appropriate registers contained in substrate 102. Connecting pins 104, 106, 108 and 110 located along the edge of substrate 102 allow appropriate clocking pulses, reset signals, ground and power to be applied to the device. Other pins represented by pin 112 carry the output signal from the 500 sensing elements to the image drift correction circuit of this invention. According to FIG. 9, the 500 photo-gates and image sensors 100 are charged coupled through transfer gates 114 to corresponding elements of analog transport shift registers 116. Dark arrows 118 represents the charge coupling process from sensors 100 through transfer gates 114 into the analog transport shift registers 116. It will be appreciated by those skilled in the art that an appropriate clock pulse applied to photo sensors 100 at input 120 will allow the accumulation of an electron charge which electron charge is linerally related to the number of image photons impinging on each of the 500 sensors. At the appropriate time, the clock pulse on 120 is removed such that no further accumulation takes place until the next cycle. During this non-accumulating period, the charge coupling transfer through transfer gates 114 to analog transfer shift registers 118 occurs by appropriate clocking pulses on the transfer gate clock input 122 and the transport register clock input 124. Again, for a more detailed explanation of the clocking pulses and the operation of the transfer gates and the analog transport registers the reader is referred to the Fairchild material available on the CCD-101 device.

The charge accumulated in the analog transport registers 118 is then charge coupled to the output registers 126 as is represented by heavy arrows 128. This charge couple transfer also takes place by the receipt of an appropriate clocking pulse at clock input 130. Output register 126 receives its charge coupled input from both of the transport registers 128 and arranges the received signals in serial form in the same sequence as was accumulated by the 500 individual image sensor elements 100. The output shift register, then provides the output signal to a precharged diode 132 which is contained in a gate charged detector output preamplifier 134. The output signal from output shift register 126 represents a sequential reading of the 500 individual image sensor elements 100 and is transferred to preamplifier 134 by means of a charged coupling process represented by dark arrow 136. An amplified output at 138 of the sequential reading of the 500 image sensor elements 100 from preamplifier 134 represents the output of drive electronics 60 to detector circuit 72 illustrated in FIG. 2. As was stated above, it will be appreciated by those skilled in the art that a simplified operation of the Fairchild device CCD-101 as discussed above is for explanation only, and for a more detailed explanation of the Fairchild device or other suitable device reader is referred to the material provided by the manufacturer of the selected device.

Thus, although the present invention has been described with respect to specific methods and apparatus for maintaining an accurate and precise location of the raster scan of a display system, it is not intended that such specific reference be considered limitatious upon the scope of the invention except insofar as is set forth in the following claims.

What is claimed is:

1. Apparatus for continuously and accurately maintaining the location of the raster produced by an energy beam on a display surface of a visual system, during operation of said visual system for its intended purpose, comprising:

optical sensing means mounted to said display surface outside of the viewing area for continuously monitoring the position of a selected portion of the path of a raster line also outside of the viewing area on said display surface during operation of said visual system for its intended purpose, said optical sensing means for determining the position of said selected portion of a raster line with respect of the location of said optical sensing means and for providing an electrical signal representative thereof;

said optical sensing means having a support structure, a photosensitive device having a multiplicity of linearly arranged photosensitive elements mounted in said support structure, said photosensitive device being oriented such that said linear arrangement is substantially at a right angle with respect to said monitored raster line path;

means mounted to said support structure between said display surface and said photosensitive device for imaging said monitored raster line path onto an area of said multiplicity of photosensitive elements, said area varying according to changes in the location of said monitor raster line path on said display surface;

circuitry for detecting which of said elements said image of said monitored raster line path impinges, and for providing said signals representative of the position of said selected portion of said raster line;

means for receiving said electrical signal, and for comparing said electrical signal with a predetermined stored reference signal representative of said selected portion of the path of a raster line properly located on said display surface, and for generating a control signal representative of the difference between said reference signal and said electrical signal; and means for combining said control signal with sweep drive signals which are produced during operation of said visual system for its intended purpose for deflecting said energy beam to produce resulting sweep drive signals which maintain said raster scan in a selected location to provide a scene properly positioned on said display surface.

2. The apparatus of claim 1 and further comprising means for unblanking a portion of the retrace raster path, and monitored portion of said raster line path is an unblanked portion of said retrace raster path.

3. Apparatus of claim 1 wherein said optical sensing means has sensitivity for detecting a deviation in the raster location as small as one half of a raster line width.

4. Apparatus of claim 1 wherein said apparatus includes a cathode ray tube, and said energy beam is the electron beam of said cathode ray tube.

5. The apparatus of claim 1 wherein said apparatus includes a cathode ray tube, and said energy beam is the electron beam of said cathode ray tube and further includes a beam splitter arranged such that a scene displayed on the screen of said cathode ray tube is visable at said beam splitter, and wherein said beam splitter is said display surface.

6. The apparatus of claim 1 wherein said apparatus includes a raster scan light projector, said energy beam is the light beam from said projector, and said display surface is a projection screen.

7. The apparatus of claim 1 and further including means for sampling said electrical signals at a predetermined periodic rate for providing signals representative of the position of said selected portion of a raster line to said receiving means at said periodic rate.

8. The apparatus of claim 7 wherein said optical sensing means has sensitivity for detecting a deviation in the raster location as small as one half of a raster line width, and wherein said monitored portion of said raster line path is an unblanked portion of the retrace raster path.

9. The apparatus of claim 1 wherein said support structure comprises a first tubular member mounted to said display surface and a second tubular member having threads suitable for joining said first and second tubular members, and wherein said means for imaging is a lens mounted in said first tubular member and said photosensitive device is mounted in said second tubular member.

* * * * *